United States Patent [19]

Goodman et al.

[11] Patent Number: 4,593,969
[45] Date of Patent: Jun. 10, 1986

[54] RUGGEDIZED GRATED OPTICAL FIBER

[75] Inventors: Jack E. Goodman, Germantown; Donald C. Schmadel, Kensington, both of Md.

[73] Assignee: Chevron Research Company, San Francisco, Calif.

[21] Appl. No.: 546,609

[22] Filed: Oct. 28, 1983

[51] Int. Cl.⁴ ................................. G02B 6/34
[52] U.S. Cl. ..................... 350/96.19; 350/96.20; 350/96.30
[58] Field of Search ............... 350/96.15, 96.19, 96.20, 350/96.29, 96.30, 96.33, 320, 96.21

[56] References Cited

U.S. PATENT DOCUMENTS

| | | |
|---|---|---|
| 3,891,302 | 6/1975 | Dabby et al. ............ 350/96.19 |
| 4,268,116 | 5/1981 | Schmadel et al. ........ 350/96.29 |
| 4,345,816 | 8/1982 | Nakai et al. ............ 350/96.20 |
| 4,400,056 | 8/1983 | Cielo ..................... 350/96.19 |
| 4,444,458 | 4/1984 | Stowe et al. ............ 350/96.15 |
| 4,444,460 | 4/1984 | Stowe ................... 350/96.19 |

FOREIGN PATENT DOCUMENTS

| | | | |
|---|---|---|---|
| 54-11753 | 1/1979 | Japan | 350/96.21 |
| 55-110207 | 8/1980 | Japan | 350/96.19 |
| 56-133707 | 10/1981 | Japan | 350/96.21 |

Primary Examiner—John Lee
Attorney, Agent, or Firm—S. R. LaPaglia; E. J. Keeling; A. Stephen Zavell

[57] ABSTRACT

A ruggedized grated optical fiber is described. The gratings in the fiber permit its use as a reflector or an interferometer when pairs of gratings having the same reflectance characteristics are spaced along the optical fiber. The ruggedized fiber comprises an optical fiber having the outer cladding removed down to an inner sheathing wherein a portion of the inner sheathing is further removed to expose the core wherein evanescent waves are encountered. The gratings are formed in this core. Surrounding the gratings and connected to the inner sheathing are two semi-tubular sections which are affixed to the inner sheathing and hermetically sealed around the gratings.

12 Claims, 1 Drawing Figure

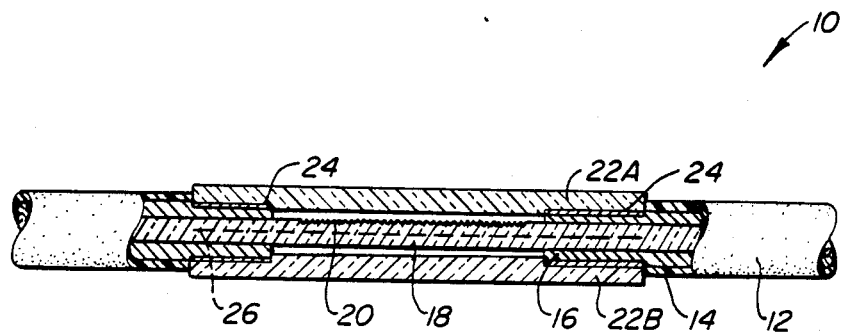
FIGURE

RUGGEDIZED GRATED OPTICAL FIBER

CROSS REFERENCE TO RELATED APPLICATIONS

"A Process of Fabricating a Portion of an Optical Fiber Capable of Reflecting Predetermined Wavelength Bands of Light", by D. C. Schmadel, Jr., U.S. Ser. No. 546,608, filed Oct. 28, 1983 (now abandoned); "Process of Tuning a Grated Optical Fiber and the Tuned Optical Fiber", by D. C. Schmadel, Jr., et al, U.S. Ser. No. 546,610, filed Oct. 28, 1983; "Process and Apparatus for Measuring an Evanescent Field in an Optical Fiber", by D. C. Schmadel, Jr., U.S. Ser. No. 546,611, filed Oct. 28, 1983; "Optical Fiber Coating Apparatus, by J. E. Goodman, U.S. Ser. No. 546,617, filed Oct. 28, 1983 (now U.S. Pat. No. 4,505,223); "Etching Fountain", by J. E. Goodman, U.S. Ser. No. 546,618, filed Oct. 28, 1983 (now U.S. Pat. No. 4,469,544) and "Optical Fiber Holder", by J. E. Goodman, U.S. Ser. No. 546,619, filed Oct. 28, 1983.

This invention relates to optical fibers. More specifically, this invention relates to optical fibers containing gratings on the optical fiber.

BACKGROUND OF THE INVENTION

When gratings are formed in optical fibers to a depth wherein evanescent waves are encountered, the grated optical fibers can be used as sensors, filters and the like. For example, the optical fiber can act as a reflector such as a Bragg reflector. Pairs of these gratings can function as interferometers. When several pairs of gratings which reflect light at different wavelengths are coupled together on a single fiber, the fiber can be used as a seismic sensor to make geophysical measurements.

Since the reflectors can be implemented on a fiber, very compact sensors can be manufactured. Therefore, numerous sensors can be employed to enhance the repetitiveness and accuracy of the seismic measurements. The gratings can be formed in accordance with the teachings of Optics Letters, Vol. 3, No. 2, pp. 66-68, August 1978, incorporated herein by reference.

A preferred method of forming the gratings is disclosed in "A Process of Fabricating a Portion of an Optical Fiber Capable of Reflecting Predetermined Wavelength Bands of Light" by Donald C. Schmadel, Jr., filed concurrently herewith. The teachings of that application are incorporated herein by reference and assigned U.S. application Ser. No. 546,608, filed in Oct. 28, 1983. This processing technique enables the manufacture of gratings of varying reflectivity. The gratings can be used as reflectors to filter undesirable wavelengths of light from the passage through the fiber. Pairs of grated optical fiber sections having the same reflective characteristics can be used as interferometers. Pairs of gratings are defined as sections of the fiber which contain gratings and are separated by a length of non-grated optical fiber.

However, either process of forming the gratings tends to weaken the fiber or make it more susceptible to stretching. These handling problems are compounded because as many as sixty or more separate gratings, i.e., thirty or more pairs, are needed on a fiber when it is used as a hydrophone for seismic exploration. Since the distance between the gratings is critical to maintain a specific reflectivity, a stretched fiber is wholly unsuitable for a specific filtering task. In addition, in actual applications, the gratings are subject to damage by breaking as well as harmonic movement from air currents which can shift the frequency of the light traveling through the fiber. Thus, it would be highly desirable to have a ruggedized grated optical fiber which is not effected by ambient conditions. In addition, it would also be desirable to have a fiber which is protected from stretching which can destroy the specific wavelengths at which light is reflected.

BRIEF DESCRIPTION OF THE DRAWINGS

The FIGURE illustrates a ruggedized grated optical fiber.

DETAILED DESCRIPTION OF THE INVENTION

The invention will be more clearly illustrated by referring to the FIGURE. A ruggedized optical fiber 10 is illustrated in the FIGURE. The ruggedized optical fiber 10 is fabricated around an optical fiber 12. Optical fiber 12 has the outer sheathing 14 removed to expose an inner sheathing 16. Preferably, optical fibers 12 are selected that have an inner sheathing 16 of a metal coating, such as indium or other suitable material beneath the outer sheathing 14. Thereafter, a portion of the indium is removed, as illustrated, to expose the inner core 18 of the fiber wherein evanescent waves are encountered. The gratings 20 are preferably fabricated on the core 18 in accordance with A Process of Fabricating a Portion of an Optical Fiber Capable of Reflecting Predetermined Wavelength Bands of Light. Alternatively, the gratings can be fabricated in accordance with B. S. Kawasaki, et al Optical Letters, Vol. 3, No. 2, August 1978. Actually, the ruggedized fiber is not limited to applications where gratings are desirable. The ruggedized fiber can be fabricated whenever it is necessary to expose the inner core of the fiber for processing, such as splicing and the like.

Two semi-tubular sections 22A and 22B are adhered to the inner sheath 16 with an appropriate material 24 capable of forming a hermetic water-tight bond with the exposed metal inner sheathing 16. Suitable materials are solder, epoxy, hot melt adhesives, and the like. When an optical fiber 12 is selected with a metal inner sheath 16, solder is preferred. Suitable materials are quartz, $SiO_2$, Supar Invar ®, and the like. Preferably, the materials, thermal coefficients of expansion should be equal to or less than the thermal coefficient of expansion of the optical fiber 12. The sections 22A and 22B are cut so as to have the same length as the distance between the ends of the exposed metal portions of the inner sheath 16. Preferably, the sections 22A and 22B should butt up against the outer sheath 14 of the optical fiber 12. The sections 22A and 22B are fitted together to form a tube around the fiber along the exposed metal 16 and soldered thereto. The lengthwise joints 26 of sections 22A and 22B are sealed together with epoxy, solder, hot melt adhesives or other suitable hermetic sealing materials.

Optionally, the space within the tube over the grating's central portion of the core 18 can be filled with oil to dampen the gratings 20 and completely isolate that portion of the fiber 12. The materials should have an index of refraction less than the index of refraction of the gratings to avoid leakage of light out of the fiber. In addition, the material must not have the same index of refraction as the gratings because this would cancel the effect of the gratings.

When used in pairs having the same reflectance along the fiber wavelengths, these paired ruggedized grated optical fibers form interferometers which can be used in seismic exploration systems and the like. Optionally, the ruggedized interferometers can be interdigitated, i.e., if there are four grating sections on a fiber, separated by non-grated fiber, the reflectance patterns of the first and third, and second and fourth sections can match. The ruggedized fibers are compact and durable.

Having described the invention with reference to particularly preferred embodiments thereof, it is not our intention to limit ourselves solely to these preferred embodiments. Modifications and variations which would be obvious to the ordinary skilled artisan are intended to be within the scope of our invention.

What is claimed is:

1. A ruggedized grated optical fiber comprising:
   an optical fiber wherein a portion of the outer cladding has been removed to expose an inner sheathing and a portion of said inner sheathing has been removed to expose an inner core upon which gratings have been formed;
   two semi-tubular sections fitting around said inner sheathing and forming a tube over said gratings;
   and hermetically joining means for sealing said sections into said tube and hermetically sealing said tube around said inner core.

2. The optical fiber according to claim 1 wherein said semi-tubular sections are fabricated from quartz, $SiO_2$, sapphire, or Supar Invar ®.

3. The optical fiber according to claim 2 wherein said semi-tubular sections are fixed to said inner sheathing by metallization and solder.

4. The optical fiber according to claim 3 wherein said semi-tubular sections are sealed together along their longitudinal seams with epoxy, or hot melt adhesive.

5. The optical fiber according to claim 4 further comprising dampening means within said tube surrounding said portion of the optical fiber containing the gratings, wherein the dampening means has a lower index of refraction than the gratings.

6. The optical fiber according to claim 5 wherein said dampening means is oil.

7. The optical fiber according to claim 5 wherein the fiber contains pairs of matched ruggedized gratings separated by non-grated optical fiber so as to form a ruggedized optical fiber interferometer.

8. The optical fiber according to claim 4 wherein the fiber contains pairs of matched ruggedized gratings separated by non-grated optical fiber so as to form a ruggedized optical fiber interferometer.

9. The process of ruggedizing an optical fiber comprising:
   priming two semi-tubular sections with an adhesive material, said semi-tubular sections capable of forming a tube around a portion of an optical fiber containing a grating;
   forming a tube with the semi-tubular sections around the inner sheathing of the optical fiber over the grated portion of the fiber;
   hermetically sealing the sections to the inner sheathing portion of the fiber and;
   hermetically sealing the longitudinal seams of the semi-tubular sections so as to form a hermetically sealed tube around the portion of the optical fiber containing the grating.

10. The process according to claim 9 wherein the sealing of said section to said inner sheathing is done by soldering.

11. The process according to claim 10 wherein the sealing of said longitudinal seams of said semi-tubular sections is done with epoxy.

12. The process according to claim 11 further comprising:
   filling the space surrounding the gratings with a dampening material having an index of refraction which is less than the index of refraction of the gratings.

* * * * *